July 27, 1965  F. H. TURBYVILLE, JR., ETAL  3,197,604
METHOD AND APPARATUS FOR WELDING
Filed April 4, 1962
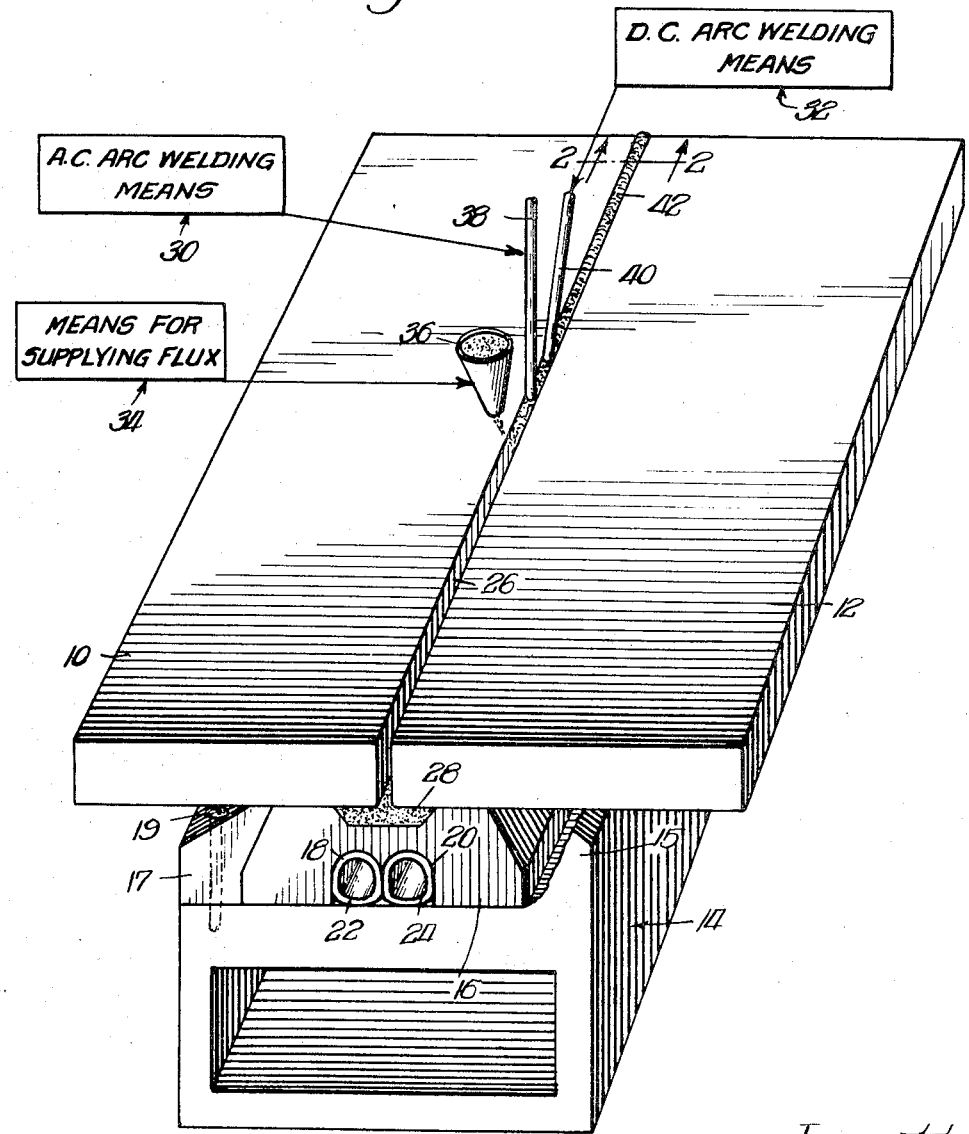
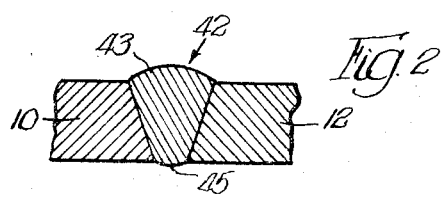
Inventors:
Frank H. Turbyville, Jr.,
Columbus Floyd,
Merven N. Pfeiffer,
Clarence Verbeek,

United States Patent Office 3,197,604
Patented July 27, 1965

3,197,604
METHOD AND APPARATUS FOR WELDING
Frank H. Turbyville, Jr., Stockton, Calif., and Columbus Floyd, Park Forest, Merven N. Pfeiffer, Calumet City, and Clarence Verbeek, Lansing, Ill., assignors to Union Tank Car Company, Chicago, Ill., a corporation of New Jersey
Filed Apr. 4, 1962, Ser. No. 184,968
2 Claims. (Cl. 219—73)

This invention relates to a method and apparatus for welding metal plates together and more particularly to a method and apparatus wherein such welding may be effected from one side of the metal plates.

One of the oldest methods of joining metal plates together is by butt welding. In this method, an electric arc weld is applied from one side of the metal plates while using a flux material to shield the electric arc from atmospheric contaminants. However, in butt welding the electric arc does not have sufficient power to penetrate the remote side of the joint and the weld bead penetrates through only a part of the joint. Therefore, after this welding has been completed, the two plates are turned over and the underside of the joint is welded. The two weld beads join to form a bead which extends through the entire joint between the metal plates.

It has long been understood that considerable savings in time, labor and materials could be effected if metal plates could be welded together from one side only. To this end, welding processes have been employed wherein the arc was sufficiently powerful to penetrate the entire length of the joint between the two metal plates. However, the power required in such a single arc process was so great that excessive welding rod was melted off and the top side of the weld bead was excessively large, i.e., excessive metal accumulated on the surface of the joint.

It is therefore an object of the present invention to provide a method and apparatus for welding together metal plates from one side only which overcomes the disadvantages of the heretofore known methods of welding metal plates.

It is a further object of the present invention to provide a method and apparatus wherein metal plates are joined together by welding from one side only to form a smooth, porosity-free weld bead having satisfactory X-ray quality.

It is a further object of the present invention to provide a method and apparatus wherein metal plates may be welded together rapidly and economically from one side only, the resultant weld bead having a thickness substantially equal to the thickness of the metal plates.

It is a further obejct of the present invention to provide a method and apparatus for welding a joint between metal plates from one side of the metal plates wherein the joint is properly cooled to prevent weld bead distortion.

It is a further object of the present invention to provide a method and apparatus for welding the edges of metal plates together from one side, wherein the edges of the metal plates do not require beveling preparatory to welding.

These and other objects are accomplished by the welding method and apparatus of the present invention. In accordance with the present invention, metal plates are welded together by two electric arcs which run in tandem along a weld joint, one of the electric arcs causing deep penetration of the weld joint and the other having a milder welding effect whereby a substantially smooth weld bead joins the two metal plates. The weld joint area is continually cooled to maintain proper temperature conditions whereby weld bead distortion is obviated.

The invention, both as to its organization and method of operation, taken with further objects and advantages thereof, will best be understood by reference to the following description taken in conjunction with the drawings, in which:

FIGURE 1 is a perspective, partially diagrammatic view of the welding method and apparatus of the present invention; and FIGURE 2 is an enlarged, fragmentary cross-sectional view taken along line 2—2 of FIGURE 1, illustrating a welding bead made by the method and apparatus of the present invention.

Referring now to FIGURE 1, metal plates 10 and 12 are illustrated as being welded together from one side only in accordance with the method and apparatus of the present invention. The present invention has particular utility in welding large metal plates together, for example, 40 foot lengths and, as shown, the metal plates 10 and 12 are placed in abutting or slightly spaced relationship to form a weld joint 26 which is welded by two electric arcs acting upon only one side of the metal plates 10 and 12. The weld bead so formed, indicated generally by reference numeral 42, is substantially smooth and penetrates through the weld joint 26. As seen in FIGURE 2, the weld bead 42 is somewhat wider on the side of the metal plates 10 and 12 adjacent the electric arcs than on the side of the metal plates 10 and 12 remote from the electric arcs.

Specifically, in accordance with the present invention, the metal plates 10 and 12 are supported upon a frame, indicated generally by reference number 14, and a back-up bar 16 with their longitudinal edges in abutting or slightly spaced relationship to form the weld joint 26. The edges of the plates 10 and 12 do not require beveling preparatory to the welding method of the present invention.

The frame 14 is used principally to support the metal plates 10 and 12 and the back-up bar 16. The frame 14 includes a longitudinally extending projection 15 (only partially shown) and an elongate holding member 17. The back-up bar 16 is placed on the frame 14 adjacent and abutting the projection 15 and the holding member 17 secured to frame 14 by bolts 19 or the like. In this manner the back-up bar 16 is securely held in position. The metal plates 10 and 12 are firmly held in intimate contact with the upper surfaces of the holding member 17, the back-up bar 16 and the projection 15 by means not shown. In this manner, the metal plates 10 and 12 are principally supported by the frame 14 and the back-up bar 16 and, moreover the metal plates 10 and 12 are maintained in contact for efficient heat transfer with the back-up bar 16.

The back-up bar 16 is employed primarily to cool the weld area, i.e., the weld joint 26. To this end, it is provided with two longitudinally extending grooves 18 and 20 in which are located pipes or tubes 22 and 24, respectively. The back-up bar 16 is made of efficient heat conductive metal, such as copper or the like, whereupon cooling fluid, such as water, flowing through the tubes 22 and 24 conducts the heat generated by the welding operation away from the metal plates 10 and 12. Preferably, the tubes 22 and 24 are made of copper, though any other efficient heat conductive material may be employed.

To assure proper heat transfer between the back-up bar 16 and the tubes 22 and 24, the tubes 22 and 24 are slightly larger than the diameter of the grooves 18 and 20. Accordingly, prior to mounting of the back-up bar 16 on the frame 14, the lower portions of the tubes extend beneath the lower surface of the back-up bar 16. Hence, when the back-up bar 16 is mounted to the frame 14, a force is applied to the upper surface of the back-up bar 16, for example, by a wooden mallet or the like, with the result that the lower portions of the tubes 22 and 24, which are located in the grooves 18 and 20, respectively, are deformed upwardly into intimate contact with the inside surfaces of the grooves 18 and 20.

The welding joint 26 between the metal plates 10 and 12 extends longitudinally over and is aligned with a longitudinally extending groove 28 defined in the back-up bar 16. Prior to welding and before the plates 10 and 12 are disposed on the back-up bar 16, the groove 28 is filled with welding flux which shapes and cleans the underside of the resultant weld bead 42 joining the metal plates 10 and 12.

Considering now in greater detail the welding apparatus method, the plates 10 and 12 are welded together by a submerged arc process. Briefly, an A.C. arc welding means 30 and a D.C. arc welding means 32 are suitably supported so as to move in tandem above and along the joint 26. In one arrangement, the A.C. welding means 30 assumes a leading position and causes a soft penetration of the weld joint 26, i.e., it tends to preheat the metal plates and forms a mass of molten metal in the weld joint. The D.C. welding means 32 assumes a trailing position and causes a vigorous penetration of the weld joint 26, i.e., it causes the molten metal to sink in and form a weld bead on the under surface of the plate. In an alternative arrangement, the positions of the A.C. welding means 30 and D.C. welding means 32 are reversed, whereby the D.C. welding means assumes a leading position and the A.C. welding means 30 assumes a trailing position. However, in this latter arrangement, the A.C. and D.C. welding means perform the identical function described above.

Referring specifically to FIGURE 1, the A.C. welding means 30 is illustrated as leading the D.C. welding means 32. Specifically, the A.C. arc welding means 30 embodies a welding electrode or rod 38 and a constant voltage control (not shown) including means to continuously supply the electrode 38 to the weld joint 26. With the use of the constant voltage control, the A.C. arc length does not drastically increase when the weld bead starts to build up, but increases only enough to maintain the desired voltage within narrow limits. This is accomplished by quickly and precisely adjusting the rate of feed of the welding electrode 38 so that the arc length and associated voltage are maintained at substantially constant values.

In order to better understand the operation of the A.C. arc welding means 30, it should be appreciated that other types of A.C. welding arrangements produce a molten mass of metal on the surface of the joint, with the result that the distance between the tip of the welding electrode and the plate being welded is decreased. This decrease in distance or arc length reduces the electrical resistance of the arc, thereby resulting in a decrease of voltage. In other types of A.C. welding arrangements, the accumulation of a molten mass of metal causes the rate of electrode feed to be drastically reduced. As a result, the sudden increase in arc length causes an excessive increase in voltage, thereby causing insufficient weld penetration. As indicated above, the A.C. arc welding means 30 overcomes all these disadvantages by quickly and precisely adjusting the rate of electrode feed. For the record, the arc welding means 30 is a commercially available welding apparatus sold and offered by Linde Manufacturing Company.

The D.C. arc welding means 32 comprises a welding rod or electrode 40 and associated controlling device which continuously supplies the welding electrode 40 to the weld joint 26. Unlike some D.C. arc welding means, it has a source of constant voltage and the feed rate of the welding rod is constant during the welding operation. Such D.C. welding means 32 is also a commercially available welding apparatus sold and offered by Linde Manufacturing Company.

The arc welding means 30 and 32, as shown in FIGURE 1, weld from one side of the metal plates 10 and 12 along the joint 26. The welding means 30 and 32 may also position and hold the metal plates 10 and 12 on the back-up bar 16. Flux is supplied to the joint 26 by means indicated generally by reference numeral 34. The flux supply means 34 is connected to a hopper 36 or the like whereby flux is deposited along the joint 26 ahead of the arc welding means 30 and 32.

During the welding process of the present invention wherein the metal plates 10 and 12 are rapidly welded together from one side only with a porosity-free weld bead having satisfactory X-ray quality, the means for supplying flux 34 and, its associated hopper 36, the A.C. arc welding means 30 and the D.C. arc welding means 32 move in tandem above and along the weld joint 26. The flux supply means 34 together with the hopper 36 deposit flux in the weld joint 26 ahead of the welding electrodes 38 and 40 of the A.C. arc welding means 30 and the D.C. arc welding means 32, respectively.

The A.C. arc welding means 30 and its welding rod 38 cause a soft penetration of the weld joint 26 thereby preheating the metal plates 10 and 12 and forming a mass of molten metal in the weld joint 26 The D.C. arc welding means 32 causes a more vigorous penetration of the weld joint 26 whereby the molten metal sinks into the weld joint 26 and forms a weld bead 42 extending through to the underside of the plates 10 and 12 as seen in FIGURE 2. The welding flux in the groove 28 below the joint 26 shapes and cleans the underside of the weld bead 42.

The weld joint area temperature is kept within desired limits to prevent bonding between the back-up bar 16 and the metal plates 10 and 12. This is effected by passing cooling water or the like through the tubes 22 and 24 during the welding operation. The cooling additionally prevents molten flux from adhering to the back-up bar 16. Furthermore, the metal plates 10 and 12 are maintained in firm contact with the back-up bar 16 to prevent molten metal from flowing between the metal plates 10 and 12 and the back-up bar 16.

Two additional conditions have an influence on the performance of the present method of welding metal plates. The first is the distance between the tips of the two welding electrodes 38 and 40. It has been found that it is preferable that the distance between the welding electrodes 38 and 40 be within the range of about ¾ inch to 2 inches, more preferably 1 inch to 1½ inches, and most preferably about 1⅛ inches. In this manner, the trailing rod 40 tends to hit a molten metal pool caused by the arc of the leading welding electrode 38 instead of a solidified bead. Furthermore, the weld bead 42 thereby remains in a molten state for a longer period of time which allows harmful gases therein to escape and thereby leave a porosity-free weld bead 42. If the distance between the tips of the welding electrodes 38 and 40 is too great, two beads of poor quality are formed, rather than one bead of superior, uniform quality. On the other hand, if the electrodes 38 and 40 are too close together, arc blow will occur, i.e., direct arcing between the electrodes 38 and 40 will result, which detrimentally affects the resulant weld bead.

Secondly, the leading electrode is vertically positioned and the trailing electrode 40 must be non-vertically positioned, i.e., inclined downwardly in the direction of travel. Preferably the trailing electrode 40 is positioned so as to be in the range of about 8° to 20° from the vertical, more preferably in the range of 10° to 15°, and most preferably about 10° to 12°. As a result of inclining the electrode 40, the welding means 30 and 32 can be spaced closer together, the forward arc force of electrode 40 is increased, and a wider, flatter bead 42 is achieved because the puddle accumulating ahead of the electrode 38 is washed or directed sideways slightly by the electrode 40.

In practicing the method and in using the apparatus of the present invention to weld steel pipe having 89½ inches inside diameter and 40 feet in length, there was produced a weld bead 42 having a generally trapezoid configuration, as shown in FIGURE 2. As illustrated, the weld bead 42 has a maximum width adjacent the upper surfaces of the metal plates 10 and 12 and a lesser width adjacent the under surface of the plates 10 and 12. More specifically, a bead reinforcement 43 at the upper end of the weld bead 42 was held between 1/16 and 1/8 of an inch, i.e., the height of the bead relative to the upper surfaces of the metal plates 10 and 12 was held between 1/16 and 1/8 of an inch, while a bead reinforcement 45 on the lower end of the weld bead 42 was held to a thickness between 0 and 1/16 of an inch, i.e., the height of the bead relative to the under surfaces of the plates 10 and 12 was held between 0 and 1/16 of an inch. In any event, it will be appreciated that the weld bead 42 produced by the present invention has upper and lower surfaces substantially conformable to the upper and lower surfaces of the plates.

As suggested above, the relative positions of the A.C. arc welding means 30 and the D.C. arc welding means 32 may be reversed, i.e., the A.C. arc welding means 30 assumes the leading position and the D.C. arc welding means 32 assumes the trailing position. In such case, the leading electrode from the D.C. arc welding means 32 causes deep penetration of the weld and the trailing electrode from the A.C. arc welding means 30 has a mild filling effect on the weld bead. In any event, it is still necessary that the distances and electrode angle be maintained in the manner described hereinbefore in order to achieve the above described desirable results.

Further it has been found that after continuously welding, in accordance with the method of the present invention, that magnetic poles of large strength are set up in the welding equipment and other auxiliary apparatus. These poles exert magnetic forces that tend to disturb the welding arcs and therefore the resultant welding bead. It has been discovered that these magnetic forces may be dissipated by reversing the tandem weld sequence.

It will be understood that the method and apparatus of the present invention may be utilized to weld curved plates such as may be used to manufacture pipe or the like. The apparatus shown in FIGURE 1 may be adapted for such manufacture merely by changing the contour of the supporting surfaces of the back-up bar 16, the projection 15 and the holding member 17 to conform to the desired curvature of the curved plates to be welded.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An apparatus for welding the edges of metal plates together comprising means to hold the edges of said metal plates in close proximity to form a joint therebetween, a first arc welding means having a first arc welding electrode, a second arc welding means having a second arc welding electrode, means to move said first and second arc welding electrodes in tandem along said joint on one side of said metal plates to form a weld bead extending through said joint, said first and second arc welding means being an alternating current arc welding means and a direct current arc welding means, respectively, said alternating current arc welding means being adapted to maintain a substantially constant arc gap between the weld bead and said first electrode.

2. The apparatus of claim 1 wherein said direct current arc welding means has a source of constant voltage.

References Cited by the Examiner
UNITED STATES PATENTS

| | | | |
|---|---|---|---|
| 1,323,556 | 12/19 | Smith | 219—160 |
| 1,844,263 | 2/32 | Priebe | 219—160 |
| 2,145,009 | 1/39 | Keir | 219—73 |
| 2,294,439 | 9/42 | Bagley | 29—365 X |
| 2,320,824 | 6/43 | Landis et al. | 219—73 |
| 2,331,937 | 10/43 | Schreiner | 219—73 |
| 2,489,002 | 11/49 | Babbitt | 219—73 |
| 2,527,336 | 10/50 | Schaefer | 219—130 |
| 2,620,423 | 12/52 | Komers et al. | 219—73 |

RICHARD M. WOOD, *Primary Examiner.*